United States Patent
Ruman

[19]

[11] Patent Number: 6,161,527
[45] Date of Patent: Dec. 19, 2000

[54] AIR ASSISTED DIRECT FUEL INJECTION SYSTEM

[75] Inventor: Mark A. Ruman, Fond du Lac, Wis.

[73] Assignee: Brunswick Corporation, Lake Forest, Ill.

[21] Appl. No.: 09/248,871

[22] Filed: Feb. 11, 1999

[51] Int. Cl.[7] .............................. F02M 23/00; B05B 7/12
[52] U.S. Cl. ................................ 123/533; 239/408
[58] Field of Search ........................ 123/531, 532, 123/533, 534, 535; 239/408, 416.5, 417.5, 585.1, 89

[56] References Cited

U.S. PATENT DOCUMENTS

| | | | |
|---|---|---|---|
| 1,627,727 | 5/1927 | Charter | 123/533 |
| 4,693,224 | 9/1987 | McKay | 123/531 |
| 4,759,335 | 7/1988 | Ragg et al. | 123/531 |
| 4,794,902 | 1/1989 | McKay | 123/533 |
| 4,841,942 | 6/1989 | McKay | 123/533 |
| 4,899,714 | 2/1990 | Schechter et al. | 123/533 |
| 4,934,329 | 6/1990 | Lear et al. | 123/531 |
| 5,020,494 | 6/1991 | Plohberger et al. | 123/250 |
| 5,036,824 | 8/1991 | Albertson et al. | 123/531 |
| 5,048,497 | 9/1991 | Kishida et al. | 123/533 |
| 5,069,189 | 12/1991 | Saito | 123/533 |
| 5,095,873 | 3/1992 | Motoyama et al. | 123/305 |
| 5,095,881 | 3/1992 | Nishimura | 123/532 |
| 5,115,786 | 5/1992 | Yamada | 123/531 |
| 5,170,766 | 12/1992 | Haas et al. | 123/531 |
| 5,249,557 | 10/1993 | Katoh et al. | 123/305 |
| 5,390,647 | 2/1995 | Schechter | 123/532 |
| 5,526,796 | 6/1996 | Thring et al. | 123/531 |
| 5,666,927 | 9/1997 | Pace et al. | 123/533 |
| 5,694,905 | 12/1997 | Nuti | 123/533 |

*Primary Examiner*—Henry C. Yuen
*Assistant Examiner*—Mahmoud M Gimie
*Attorney, Agent, or Firm*—William D. Lanyi

[57] ABSTRACT

A fuel injection system incorporates a plurality of fuel injection arrangements, wherein each fuel injection is associated with a particular cylinder of the engine. Each of the fuel injection arrangements comprises a fluid passageway in which fuel and air are combined prior to injection into a combustion chamber of the cylinder. A valve is moveable with respect to an injection port to allow the pressurized fuel/air mixture to flow from the fluid passageway into the combustion chamber. A fuel injector is used to inject liquid fuel into the fluid passageway to be combined with pressurized air within the passageway. The system has a common air rail and a common fuel rail which are each connected to a plurality of the fuel injection arrangements. Upward movement of a piston within a cylinder is used to pressurize the air within the common air rail. All of the fuel injection arrangements can be used to contribute pressurized air to the common air rail.

12 Claims, 6 Drawing Sheets

AIR ASSISTED DIRECT FUEL INJECTION SYSTEM

BACKGROUND OF THE INVENTION

1. Field of the Invention

The present invention is generally related to a direct fuel injection (DFI) system and, more particularly, to a direct fuel injection system that incorporates a common air rail with an air passage formed in the head of the engine, a common fuel rail with a fuel passage formed in the head of the engine, and a means for metering fuel into cylinders of the engine as a function of the pressure within the common fuel rail and the time that a fuel injection valve is opened.

2. Description of the Prior Art

Many types of direct fuel injection systems are known to those skilled in the art.

U.S. Pat. No. 5,694,905, which issued to Nuti on Dec. 9, 1997, discloses a fuel metering arrangement in pneumatically assisted direct fuel injection devices. The arrangement is used for pneumatically assisted direct fuel injection into an internal combustion engine cylinder head provided with a chamber housing a connecting rod for operating a compression piston slidingly guided within a jacket provided with one or more transfer conduits. The conduits connect the internal chamber to a variable dimension space positioned downstream of the piston and upstream of a valve providing access to a combustion chamber. Fuel feed means are connected to the variable dimension space. In this manner, a very rapid transient is achieved during acceleration.

U.S. Pat. No. 5,095,881, which issued to Nishimura et al on Mar. 17, 1992, describes a cylinder injection type internal combustion engine. A fuel air injection system for a two cycle crankcase compression internal combustion engine is described. A pressure accumulator is provided in the injector and the accumulator is charged with a compressed charge from the combustion chamber into which the injector injects during a phase of operation. In one embodiment of the invention, the accumulator chamber is charged during a compression stroke when ignition does not occur and in another embodiment of the invention, the accumulator chamber is charged during the same stroke of the engine when ignition occurs.

U.S. Pat. No. 5,666,927, which issued to Pace et al on Sep. 16, 1997, discloses a fuel/air supply system for a fuel injector and methods of operation. The fuel and air supply system provides fuel from a fuel pump at a first pressure upstream of a pressure reducer, with fuel being provided directly to the fuel injector at a reduced pressure on the downstream side of the pressure reducer. A bypass line is connected in communication with the fuel line upstream of the pressure reducer and provides fuel to an air reservoir at the first pressure. The air reservoir lies in communication with a porous member in the fuel injector in an air inlet to a fuel volume within the injector upstream of the pressure reducer.

U.S. Pat. No. 5,526,796, which issued to Thring et al on Jun. 18, 1996, discloses an air assisted fuel injector with timed air pulsing. A fuel injector valve controls both the metered flow of fuel and the metered flow of air into a mixing chamber, permitting intermittent, cyclic flow of both air and fuel into the chamber. The controlled cycling of both the air and fuel flow permits optimization of fuel performance. A single action valve and a dual action valve are disclosed. The air flow and fuel flow may be independently adjusted for maximum flexibility.

U.S. Pat. No. 5,390,647, which issued to Schechter on Feb. 21, 1995, describes an air charging valve for an air forced fuel injector. The valve is used with an air forced fuel injection system. The charging valve admits and stores compressed air from the engine cylinder and releases into the fuel injector to force out the air/fuel mixture into the engine cylinder. The charging valve accepts the pressurized air from the engine cylinder without allowing any air to escape back into the combustion chamber once it is in the air charging valve. The fuel injection system includes an injector having a fuel and air mixing chamber that includes a normally closed injector valve; the chamber being for premixing air and fuel before introduction of the compressed air which causes the fuel injection event.

U.S. Pat. No. 5,249,557, which issued to Katoh et al on Oct. 5, 1993, discloses a fuel injection system for a two cycle engine. The system is used for engines that employ a fuel injector that sprays into a chamber to which the compressed air is delivered and which chamber communicates with the combustion chamber through a port that is opened and closed by the reciprocation of the piston if applied to a reciprocating engine. The source of compressed air may either be an air compressor or a crankcase chamber of the engine and the air compressor and/or crankcase chamber may also provide scavenging air for the engine. A variety of port arrangements are disclosed which include either single ports or a plurality of ports either circumferentially or axially spaced from each other and disposed between either the scavenge ports and exhaust ports or around a scavenge or an exhaust port.

U.S. Pat. No. 5,170,766, which issued to Haas et al on Dec. 15, 1992, describes a fuel and air injection for a multi-cylinder internal combustion engine. The fuel and air assembly is provided for furnishing an air and fuel mixture under pressure to a cylinder of an ignition fired internal combustion engine which utilizes a solenoid-actuated valve timed to admit the mixture into the cylinder. A standard fuel injector is interfaced with one end of a mixing insert which is connected at the other end to an air passage of a fuel rail. At one side of the insert is an outlet passage leading to the solenoid actuated valve which has an outlet end shaped to enhance fuel distribution and combustion. The mixing insert contains an air filter and passages to conduct air to the common passage for air and fuel. The insert is captured in the fuel rail between a locating shoulder and the fuel injector for proper positioning relative to the timed valve. An adapter cap on the solenoid assembly joins the insert to the valve controlled passage to the cylinder.

U.S. Pat. No. 4,934,329, which issued to Lear et al on Jun. 19, 1990, describes a fuel injection system for a multi-cylinder engine. The system includes a rigid elongated unitary member incorporating a gas supply duct, a fuel supply duct, and a fuel return duct. Each of these extends in the direction of elongation of the unitary member. A separate fuel metering device and fuel injecting device is provided for each engine cylinder. The fuel metering device is arranged to deliver metered quantities of fuel to the fuel injection device and is in communication with the fuel supply and fuel return ducts so that fuel can be circulated through each of the fuel metering devices. The fuel injecting devices are each in communication with the gas duct and communicable with one of the engine cylinders. The fuel injection devices are adapted to effect delivery of a metered quantity of fuel entrained in gas supplied from the gas duct when the fuel injecting device is in fluid communication with a cylinder.

U.S. Pat. No. 4,899,714, which issued to Schechter et al on Feb. 13, 1990, discloses air/gas forced fuel injection system. A fuel injection system includes an injector having a fuel and air/gas mixing chamber that includes a normally closed injector valve, the injector being for premixing fuel and air. Controls provide a time interval between introduction of the fuel into the air chamber and the introduction of compressed air/gas to cause the injection event by opening of the valve to permit evaporation of the fuel whereby a premixed rich air/fuel mixture charge is discharged into the engine combustion chamber.

U.S. Pat. No. 4,693,224, which issued to McKay on Sep. 15, 1987, discloses a fuel injection method and apparatus. Gas is supplied to a fuel holding chamber to maintain a reference pressure which is above atmospheric pressure in the fuel holding chamber. A metered quantity of fuel is delivered into the holding chamber against the reference pressure. Communication is established between the holding chamber and the engine, and the supply of gas to the holding chamber is maintained while the communication exists so the pressure of the gas is sufficient to display the metered quantity of fuel from the holding chamber to the engine.

U.S. Pat. No. 4,759,335, which issued to Ragg et al on Jul. 26, 1988, describes a direct fuel injection by compressed gas. The fuel injection method and apparatus for in-cylinder injection in an internal combustion engine is disclosed. Compressed is used to inject the fuel through an injection nozzle particularly shaped so that different fuel spray patterns are produced at high and low fueling rates. At higher rates of fueling corresponding to higher engine loads the fuel spray pattern is narrowed and penetrates further into the cylinder volume whereas at lower rates of fueling corresponding to lower engine loads the fuel spray pattern is wider. The spray pattern is also less penetrating and relatively more confined. By appropriate selection of nozzle shape, the spatial distribution of the fuel spray droplets can be made to vary favorable over a range of engine loads.

U.S. Pat. No. 4,841,942, which issued to McKay on Jun. 27, 1989, discloses a method and apparatus for metering fuel. A continuous supply of fuel is provided by a pump to a fixed capacity chamber and gas under pressure is admitted periodically to the chamber to maintain in the chamber a pressure not greater than the fuel pressure so that fuel will flow into the chamber as long as there is a pressure differential between the gas in the chamber and the fuel supply. A delivery port in the chamber is opened for substantially the duration of the period that gas is admitted to the chamber so that the fuel in the chamber at the time of admission of gas thereto and fuel entering the chamber during the period of admission of gas, is delivered from the delivery port to the engine. The pressure differential between the fuel supply and the gas in the chamber is controlled in accordance with the fuel demand of the engine to control the quantity of fuel delivered each cycle to the engine. A preferred form of each of a fuel referencing regulator, a fuel regulator, and a metering and injection unit are described.

U.S. Pat. No. 5,069,189, which issued to Saito on Dec. 3, 1991, describes a fuel injection system for an internal combustion engine. Two embodiments of fuel/air injectors for an internal combustion engine are described wherein the main air delivery valve is actuated by a solenoid having a winding and wherein the solenoid winding is cooled by fuel in a jacket surrounding it which fuel is also delivered to the fuel injector. In one embodiment, the fuel injector solenoid and air control valve are all coaxial and in the other embodiment the fuel injector injects perpendicularly to the delivery valve and the solenoid.

U.S. Pat. No. 5,115,786, which issued to Yamada on May 26, 1992, discloses a fuel injection control system. The system includes an arrangement for opening the injector valve after the engine has stopped so as to purge the injector of any accumulated fuel. The injection valve may be opened and closed through a number of repeated cycles which assist in the removal of carbon deposits or may be held open for a fixed time period. In addition, if the injector is of the air/fuel type, any compressed air in the chamber can be utilized to purge the fuel and also the opening of the injection valve will preclude the accumulation of air pressure in the system after the engine has been shut down.

U.S. Pat. No. 5,095,873, which issued to Motoyama et al on Mar. 17, 1992, describes a fuel injection system and a method for an engine. The fuel injection system and control method for a two cycle crankcase compression internal combustion engine is disclosed wherein air and fuel are directly injected into the combustion chamber of the engine and the idle speed is maintained constant by varying the timing of fuel injection. Fine tuning of the idle speed is further accomplished by changing the duration of fuel injection under certain conditions.

U.S. Pat. No. 5,036,824, which issued to Albertson et al on Aug. 6, 1991, describes a fuel injection system. A fluid rail assembly supports a fuel metering injector and a charge delivery on an engine. The charge delivery injector includes flutes spaced about the interior of the nozzle to promote formation and delivery of a charge of fuel and air having desired spray characteristics. The fluid rail body includes passages that provide air to assist in delivering fuel from the fuel metering injector through the charged delivery injector to the engine, the passages being constructed to inhibit back flow of fuel therethrough.

U.S. Pat. No. 5,020,494, which issued to Plohberger et al on Jun. 4, 1991, discloses a method and device for feeding fuel into the combustion chamber of an internal combustion engine. Certain steps are followed to withdraw a small amount of compressed hot gas via a valve opening into the combustion chamber of the cylinder during one working cycle. This process also stores this small amount of hot gas, in a valve chamber of the valve, to inject fuel into the valve chamber containing the small amount of hot gas. It further builds a fuel/gas mixture and injects the fuel/gas mixture through the valve opening into the combustion chamber of the cylinder during the next working cycle of the internal combustion engine.

Existing direct fuel injection systems increase the cost of the engine significantly because of their complexity. In addition, because of the location of some of the known types of direct fuel injection systems relative to the head of the engine, the fuel/air mixture must travel a considerable distance to enter the cylinder. It would therefore be significantly beneficial if a direct fuel injection system could be provided which reduces the overall cost of the system and mixes the fuel and air within the structure of the engine head at a location which is close to the cylinder.

SUMMARY OF THE INVENTION

A fuel injection system made in accordance with the present invention comprises an engine with a plurality of cylinders, a common air rail, and a common fuel rail. A pressure regulator maintains a generally constant pressure differential between the common air rail and the common fuel rail.

The fuel injection system of the present invention, in a preferred embodiment, also comprises a plurality of fuel injection arrangements in which each of the fuel injection arrangements are located at an associated one of the plurality of cylinders of the engine. Each of the plurality of fuel injection arrangements comprises a fluid passageway, a valve, and a fuel injector. The fluid passageway is formed within a head of the engine and extends in fluid communication with a combustion chamber of an associated one of the plurality of cylinders at an injection port. The fluid passageway is in fluid communication with the common air rail. The valve is moveable between a closed position and an open position with respect to the injection port. The fuel injector is disposed in fluid communication with the fluid passageway and with the common fuel rail to cause a preselected quantity of fuel to flow from the common fuel rail to the fluid passageway. The preselected quantity of fuel is determined by the pressure within the common fuel rail and the time that the fuel injector permits the fuel to flow from the common fuel rail toward the fluid passageway.

As a result of the structure of the present invention, the common air rail and the common fuel rail are both connected in fluid communication with each one of the plurality of fuel injection arrangements to provide both fuel and air to each one of the plurality of cylinders of the engine.

In a particularly preferred embodiment of the present invention, the common air rail is pressurized by the charge compressed within at least one of the plurality of cylinders during at least a portion of the cycle of operation of the engine. In addition, a particularly preferred embodiment of the present invention also places the common air rail within the head of the engine. The common air rail can be cast as a cavity within the head of the engine. Similarly, the common fuel rail is contained within the head of the engine and can be cast as a cavity within the head.

In certain embodiments of the present invention, it further comprises an air compressor that is connected in fluid communication with the common air rail to provide pressurized air to the common air rail. In certain embodiments of the present invention, the common air rail is pressurized both by the air compressor and by the charge compressed within at least one of the plurality of cylinders during at least a portion of a cycle of operation of the engine.

Although the present invention can be used on many different types of engines, one particularly applicable engine comprises six cylinders with each of the cylinders having a fuel injection arrangement such as that described above. The common air rail is connected in fluid communication with each of the six fuel injection arrangements. Alternatively, two common air rails can be used in which one common air rail is used with three of the cylinders and the other common air rail is used with the other three remaining cylinders.

In certain embodiments of the present invention, one of the cylinders can be used as a compressor to provide pressurized air to the common air rail. This cylinder, can be a cylinder that is periodically used as a torque providing cylinder and periodically used as an air compressing cylinder. Alternatively, each of the plurality of cylinders can be periodically used to pressurize the common air rail during at least a portion of the cycle of operation of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMMBODIMENT

Figure 1A:
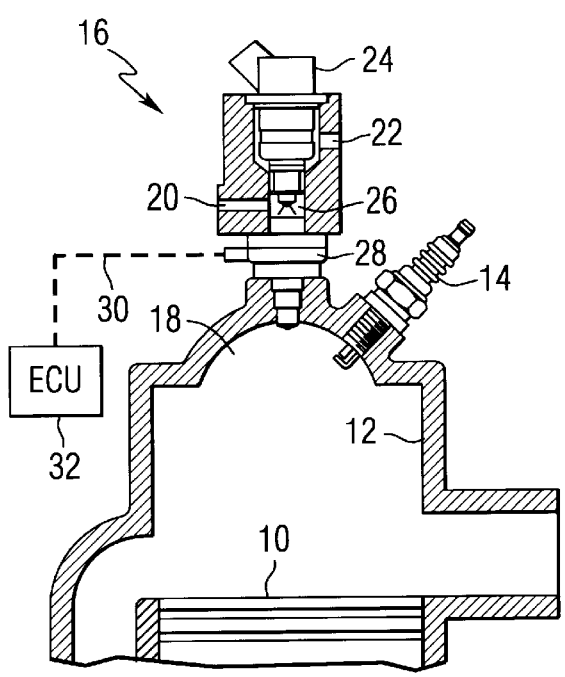
FIGS. 1A–1D show various known types of direct fuel injection systems.

Throughout the description of the preferred embodiment, like components will be identified by like reference numerals.

FIGS. 1A–1D represent examples of prior art direct fuel injection systems. In each of the examples of prior art shown in FIGS. 1A–1D, a piston 10 is disposed for reciprocal motion in a cylinder 12 and a spark plug 14 is used to provide a spark that ignites a fuel/air mixture within the cylinder 12. A fuel/air mixture is injected by a fuel injection device 16 into the combustion chamber 18 of the cylinder 12.

In FIG. 1A, compressed air is provided at port 20 and pressurized fuel is provided at port 22. A fuel injector 24 injects fuel into a cavity 26 which is pressurized at approximately 80 psi. The fuel is provided at port 22 at a pressure of about 90 psi. After being combined in the cavity 26, the air injector 28 permits the spray of the fuel and air to enter the combustion chamber 18 upon a command received on line 30 from an engine control unit 32.

Figure 1B:
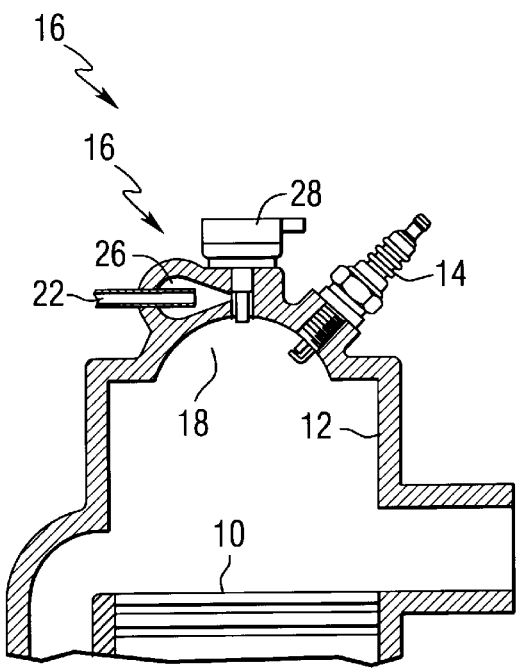

FIG. 1B shows another type of known fuel injection system in which fuel is provided through port 22 into a cavity 26. An injector 28, which is generally similar to the injector 28 described above in conjunction with FIG. 1A, is used to open an injection port which allows the fuel and air to flow from cavity 26 into combustion chamber 18. The air injector 28 is controlled by an engine control unit (ECU) such as that described above in conjunction with FIG. 1A.

Figure 1C:
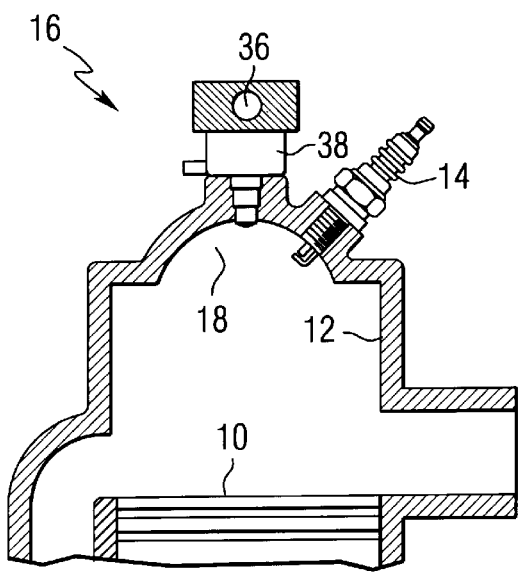

FIG. 1C shows a fuel injector device 16 which provides a fuel rail 36 in which high pressure fuel, at approximately 400 psi to 2000 psi, is injected into the combustion chamber 18 through a fuel injector 38. It should be understood that the fuel in the fuel rail 36 of FIG. 1C is contained at a pressure that is much higher than the 90 psi fuel described above in conjunction with FIGS. 1A and 1B.

Figure 1D:
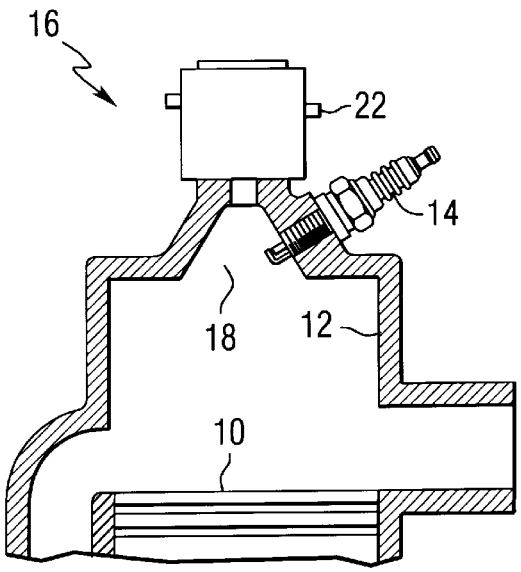

FIG. 1D shows a direct fuel injection system that uses a fuel injector 16 to control the injection of fuel received at port 22 at approximately 30 psi. The fuel is then electromechanically pressurized to approximately 200–400 psi and injected into the cylinder.

With reference to FIGS. 1A–1D, it can be seen that various designs of direct fuel injection systems are known to those skilled in the art.

Figure 2:
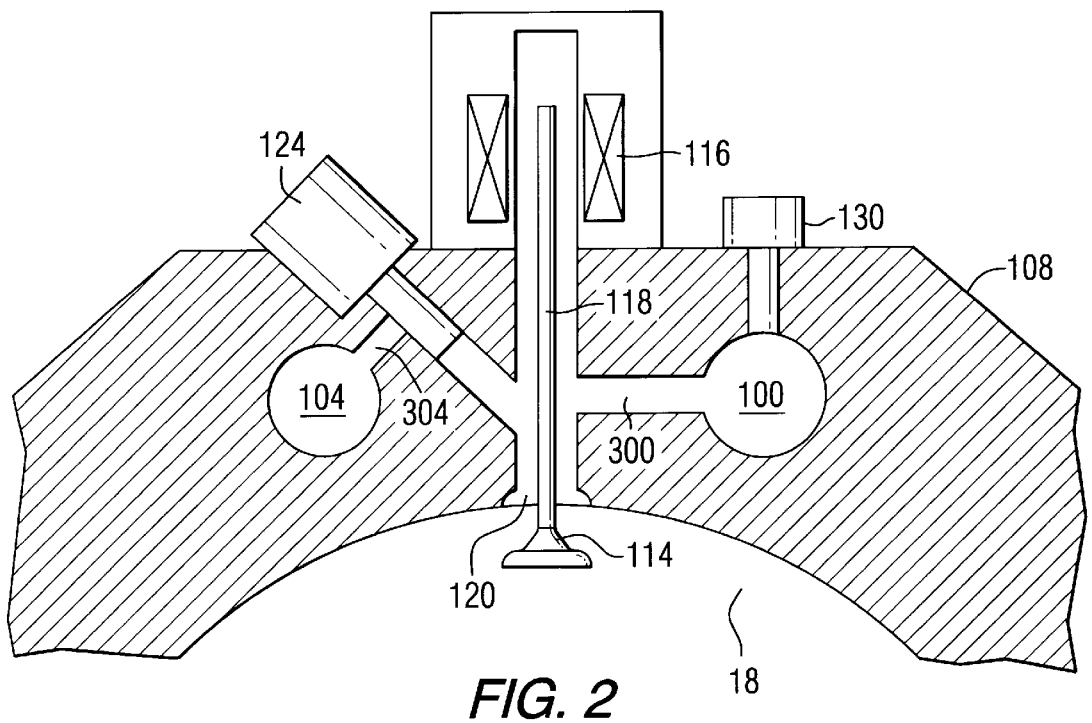
FIGS. 2 and 3 are highly simplified schematic representations of two embodiments of the present invention.

FIG. 2 shows a highly simplified illustration of one embodiment of the present invention. A common air rail 100 and a common fuel rail 104 are provided within the head 108 of the engine. The pressure of the fuel within the common fuel rail 104 is maintained at approximately 90 psi. The air pressure within the common air rail 100 is maintained at approximately at 80 psi. This allows a fuel injector 124 to control the flow of fuel from the common fuel rail 104 into a fluid passageway 110 formed within the head 108 of the engine. A valve 114 is controlled by a solenoid 116 which can cause the shaft 118 of the valve to move up and down in FIG. 2. With the valve 114 in an upward position to block the injection port 120, the fluid passageway 110 is maintained at a pressure of approximately 80 psi as a result of its connection in fluid communication with the common air rail 100 which is maintained at a pressure of approximately 80 psi. This allows the fuel to flow from the common fuel rail 104 into the fluid passageway 110 under the control of the fuel injector 124.

With continued reference to FIG. 2, it can be seen that the preferred embodiment illustrated has several characteristics that define it. First, the cylinders of the engine share a common air rail 100 and a common fuel rail 104. Secondly, the common air rail 100 and the common fuel rail 104 are both located and contained within the head 108 of the engine. The pressure of the air within the common air rail 100 is maintained at a preselected magnitude, such as 80 psi, by a regulator 130. By also controlling the pressure of the fuel within the common fuel rail 104, the relative pressures of the common air rail and common fuel rail can be maintained at a predetermined differential pressure. Another characteristic of the embodiment of the present invention shown in FIG. 2 is that the fuel metering is performed in a pressure-time manner. In other words, the time period that the fuel injector 124 is opened and the pressure of the fuel within the common fuel rail 104 determine the amount of fuel that flows into the fluid passageway 110 during each fuel injection cycle. Following the flow of fuel into the fluid passageway 110, the valve 114 is moved downward by the solenoid 116 to open the injection port 120 and allow the pressurized fuel/air mixture to spray into the combustion chamber 18.

Figure 3:
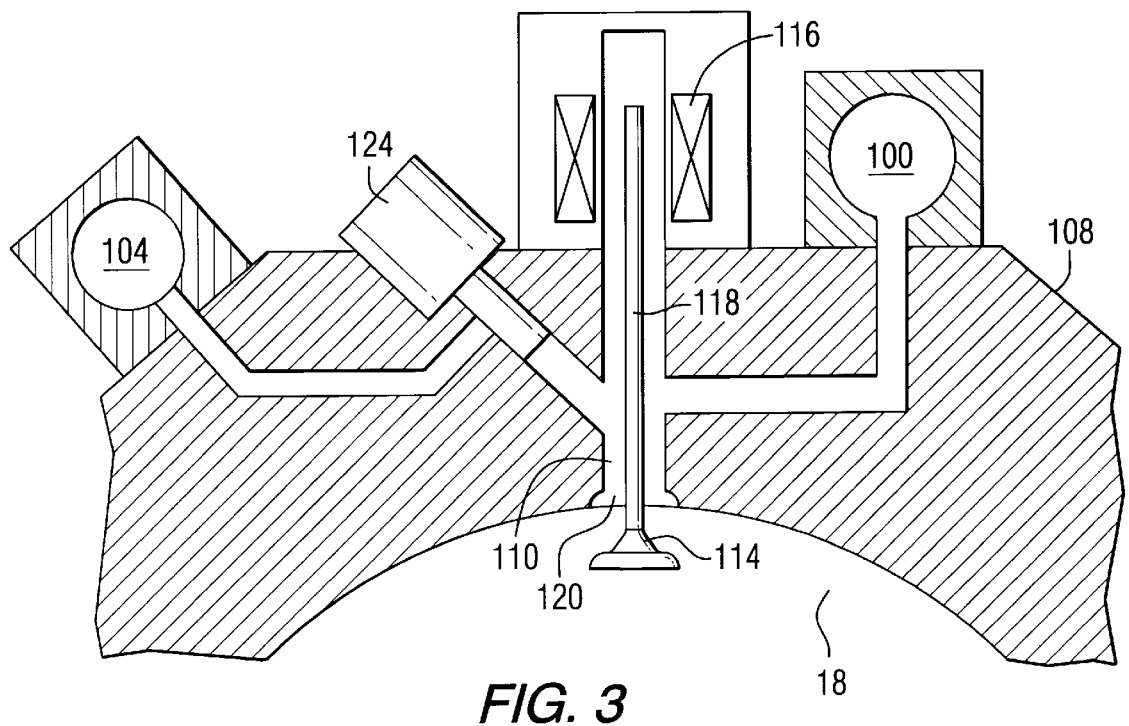
Figure 5:
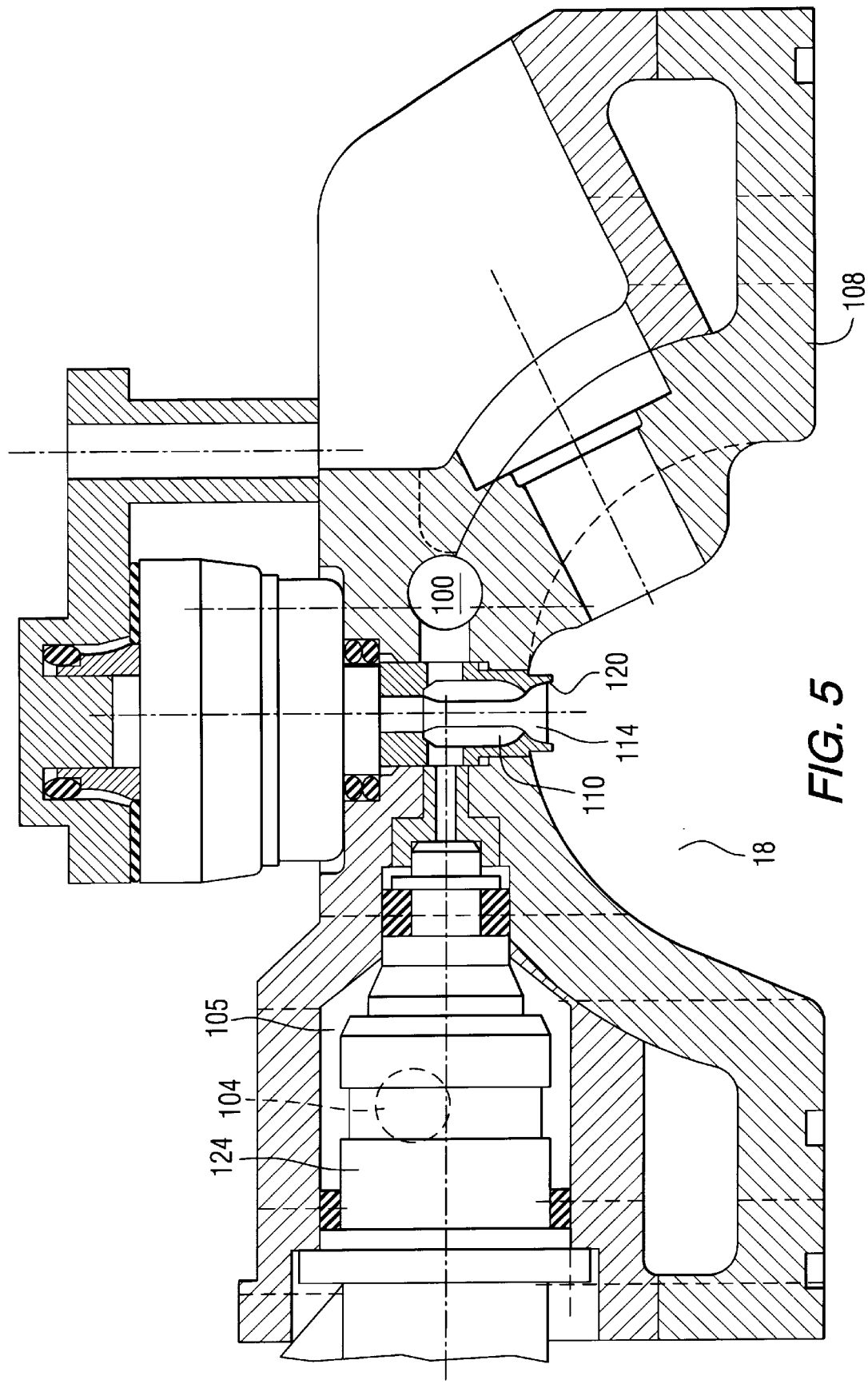
FIG. 5 is a representation of the present invention which contains both the air rail and fuel rail within a head of the engine.

It can be appreciated that the system shown in FIG. 2 is generally less complex than the systems described above in conjunction with FIGS. 1A–1D. The common fuel rail and common air rail are shared by all of the cylinders of the engine. The mixing of the fuel occurs within the fluid passageway 110 that is formed within the head 108. The components are relatively simple and the mixing of the fuel and air occurs at a location which is very close to the injection port 120. This results in a consistent and complete flow of the fuel/air mixture into the combustion chamber 18 and also provides several other advantages. For example, it is unlikely that fuel will flow in a reverse direction through the fluid passageway 110 and into the common air rail 100 under the influence of increased pressure within the combustion chamber 18. If this occurs, the quantity of fuel within the common air rail 100 can affect the amount of compressed air that flows through the fluid passageway 110 during each cycle of the system. As will be described in greater detail below, the present invention provides a structure that has several inherent benefits. First, the relatively short delivery path for the fuel allows for improved metering accuracy and control. There is significantly less likelihood that fuel will be entrained within the passage and not be injected into the combustion chamber during any given fuel injection cycle. In addition, the injection of both fuel and air from the sides of the main conduit in which the valve shaft 118 reciprocates is more economical to manufacture than traditional top delivery systems which must be more complex in order to allow both air and fuel to travel in parallel paths over the significant distance from the external injectors to the combustion chamber. In addition, the structure of the present invention allows the fuel delivery point to be segregated from the air rail, as illustrated in FIGS. 2, 3 and 5, in order to prevent fuel from inadvertently entering the air rail in embodiments that use the combustion chamber to pressurize the air rail. The configuration of the present invention makes it significantly more difficult for fuel to be carried toward the air rail during the charging of the air rail by the combustion chamber. When the fuel and air rails are included within the head of the engine, installation is compact and low in weight, which is an important feature for any marine engine application. By limiting the number of heavy components mounted externally to the engine, vibration problems are minimized because fewer heavy components are mounted distant from the center of mass of the engine system. When the fuel and air rails are included as part of the head of the engine, both the fuel and air are heated prior to injection. The increased temperature of the fuel and air enhances the mixture preparation in the cylinder.

The fuel injection arrangement shown in FIG. 2 describes a system, or fuel injection arrangement, which is provided for each cylinder. Although the common air rail 100 and common fuel rail 104 are connected in fluid communication with all of the fuel injection arrangements of the engine, the fuel injector 124, valve 114, fluid passageway 110, solenoid 116, and shaft 118 are separately provided for each fuel injection arrangement at each cylinder of the engine.

FIG. 3 shows a different embodiment of the present invention than that illustrated in FIG. 2. The primary difference between the embodiment shown in FIG. 3 and the embodiment shown in FIG. 2 is that the common air rail 100 and the common fuel rail 104 are both external to the head 108 of the engine. The two common rails, 100 and 104, are both contained in external components which are attached to the head 108. The remaining portions of the fuel injection arrangement shown in FIG. 3 are similar to those illustrated in FIG. 2. The air and fuel rails in both embodiments are connected in fluid communication with each of the fuel injection arrangements for each cylinder.

The fuel injection arrangement shown in FIG. 3 operates in a manner similar to that described above. The fluid passageway 110 is maintained at generally the same pressure as the common air rail 100. The fuel in the common fuel rail 104 is maintained at a slightly higher pressure so that the fuel injection 124 can permit fuel to flow from the common fuel rail into the fluid passageway 110 for a preselected period of time so that the appropriate quantity of fuel can be metered into the fluid passageway 110. When the valve 114 moves downward in response to movement of the shaft 118, the fuel/air mixture is allowed to flow through the injection port 120 and into the injection chamber 18.

It should be understood that both FIGS. 2 and 3 are highly simplified schematic illustrations to show the basic components and basic concept of the present invention. In all embodiments of the present invention, the common air rail 100 and common fuel rail 104 extend along a plurality of pistons and are connected in fluid communication with each of the fuel injection arrangements that provide fuel injection for each of the cylinders. FIGS. 2 and 3 do not specifically show the common air rail and common fuel rail extending along a plurality of cylinders, but it should be understood that a single tubular structure, whether provided integral to the head 108 or external to the head 108, extends along the plurality of cylinders and is connected to each of the fluid passageways which extend through injection ports into the individual cylinders.

Figure 4:
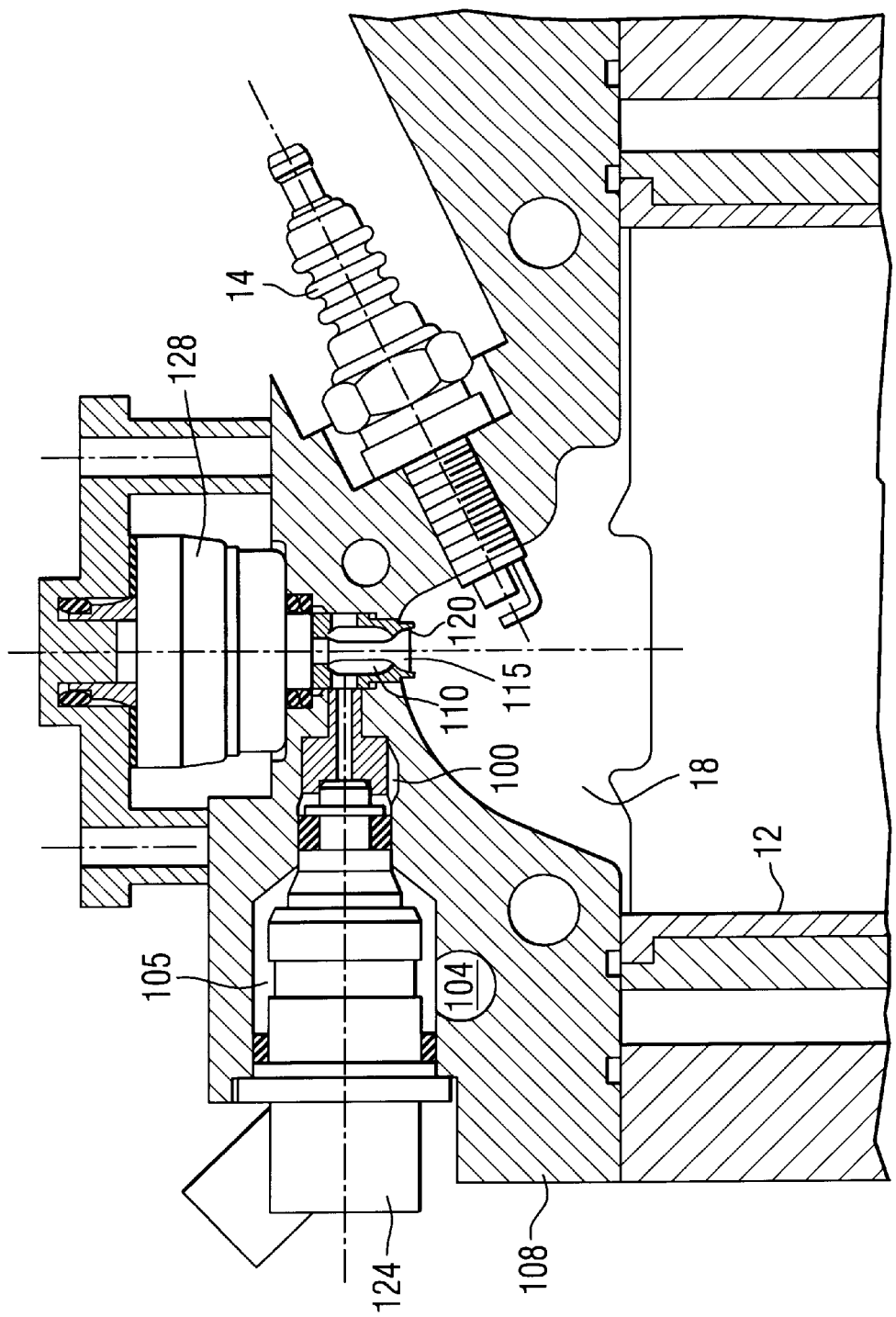
FIG. 4 is an illustration of the present invention which has been tested.

FIG. 4 shows an embodiment of the present invention that has been tested. The fuel rail 104 is formed within the head 108 of the engine. The fuel rail extends along the length of the head 108 and is in fluid communication with each of a plurality of fuel injection arrangements. At the site of each cylinder 12, an opening 105 is formed in the head 108 to communicate with the fuel rail 104 at the location where a fuel injector 124 is located. A common air rail 100 is formed externally to the head 108 and contains pressurized air that is in fluid communication with each of the fuel injection arrangements. The pressurized air of the common air rail 100 is present in the fluid passageway 110 at a pressure of approximately 80 psi. Fuel from the common fuel air 104, at a pressure of approximately 90 psi, is allowed to flow into the fluid passageway 110 when the fuel injector 124 is opened. The period of time that the fuel injector 124 is opened to allow fuel to flow from the common fuel rail 104 and cavity 105 into the fluid passageway 110 determines the quantity of fuel injected into the passageway 110. When the air injector 128 causes the valve 115 to move downward in FIG. 4, this downward movement opens the injection port 120 and allows the fuel/air mixture to flow under pressure through the injection port 120 and into the combustion chamber 18.

FIG. 4 can be compared to FIGS. 2 and 3 to see that certain common elements of the present invention are present in all three embodiments. First, the common air rail 100 is provided and connected in fluid communication with each of the plurality of fuel injection arrangements at each of the cylinders. In addition, the common fuel rail 104 is similarly provided and connected in fluid communication with each of the plurality of fuel injection arrangements at each of the cylinders. In addition, the fuel rails in FIGS. 2 and 4 are contained within the head 108 of the engine. In all of the three embodiments shown in FIGS. 2, 3, 4, the fluid passageway 110 is disposed within the head 108 and in close proximity to the injection port 120. This is important because it allows the fuel/air mixture to be completely forced into the combustion chamber 18 without any residual fuel remaining in the fluid passageway 110, even at very high operating speeds of the engine which allow the injection port 120 to remain open for only a brief period of time. In addition, when the present invention is used in a manner that allows pressure to flow from the combustion chamber 18 into the common air rail 100, the likelihood of liquid fuel being forced into the common air rail 100 is significantly reduced because the fuel/air mixture is likely to be completely injected from the fluid passageway 110 into the combustion chamber 18. This advantage is due to the fact that the short passages of the present invention minimize the amount of fuel that will wet the internal surfaces of the passages and not be completely injected into the combustion chamber. As a result, a significantly high portion of the metered fuel will be carried from the fuel passages and be delivered into the combustion chamber.

FIG. 5 shows an embodiment of the present invention that is generally similar to that shown in FIG. 4, but with a common air rail 100 that is formed within the head 108 of the engine. The common fuel rail 104 is represented by dashed lines in FIG. 5 because it is a generally cylindrical cavity extending perpendicular to the plain of the drawing in FIG. 5 and behind the fuel injector 124. It is connected in fluid communication with cavity 105 to provide fuel which is injected by the fuel injector 124 into the fluid passageway 110. As in the other embodiments of the present invention, the pressure within the common fuel rail 104 is maintained generally constant at a pressure at approximately 90 psi. Because of this known and constant pressure, the fuel can be accurately metered from the common fuel rail 104 to the fluid passageway 110 by accurately timing the period during which the fuel injector 124 remains opened to allow fuel to flow from cavity 105 into the fluid passageway 110. As in the previously described embodiments of the present invention, the fluid passageway 110 is maintained at the pressure of the air within the common air rail 100 which is approximately 80 psi. Downward movement of the valve 114 opens the injection port 120 and allows the pressurized fuel/air mixture to flow through the injection port 120 into the combustion chamber 18.

With reference to FIGS. 4 and 5, it should be noted that the air rail 100 and fuel rail 104 are on opposite sides of the fluid passageway 110 in FIG. 5. This is beneficial because, when the combustion chamber is used to pressurize the air rail 100, it is less likely that fuel can be drawn into the air rail 100 by the passage of air from the combustion chamber toward the air rail. In comparison, FIG. 4 shows the air rail 100 being on the same side of the fluid passageway 110 as the fuel rail 104. When the combustion chamber 18 is used to pressurize the air rail 100, fuel that exists in the passageway between the air rail 100 and the fluid passage 110 can be forced, toward the left in FIG. 4, into the air rail 100 by the passage of air from the combustion chamber 18 toward the air rail 100. Although both of the embodiments shown in FIGS. 4 and 5 provide the basic advantages of the present invention, the embodiment of FIG. 5 is advantageous because of its significantly reduced susceptibility to having liquid fuel forced into the air rail 100 when the system is used in the manner which causes the combustion chamber to pressurize the air rail. If the present invention does not use the combustion chamber to pressurize the air rail but, instead, uses an individual air compressor for these purposes, this advantage of the embodiment of FIG. 5 over the embodiment in FIG. 4 becomes less significant.

Figure 6:
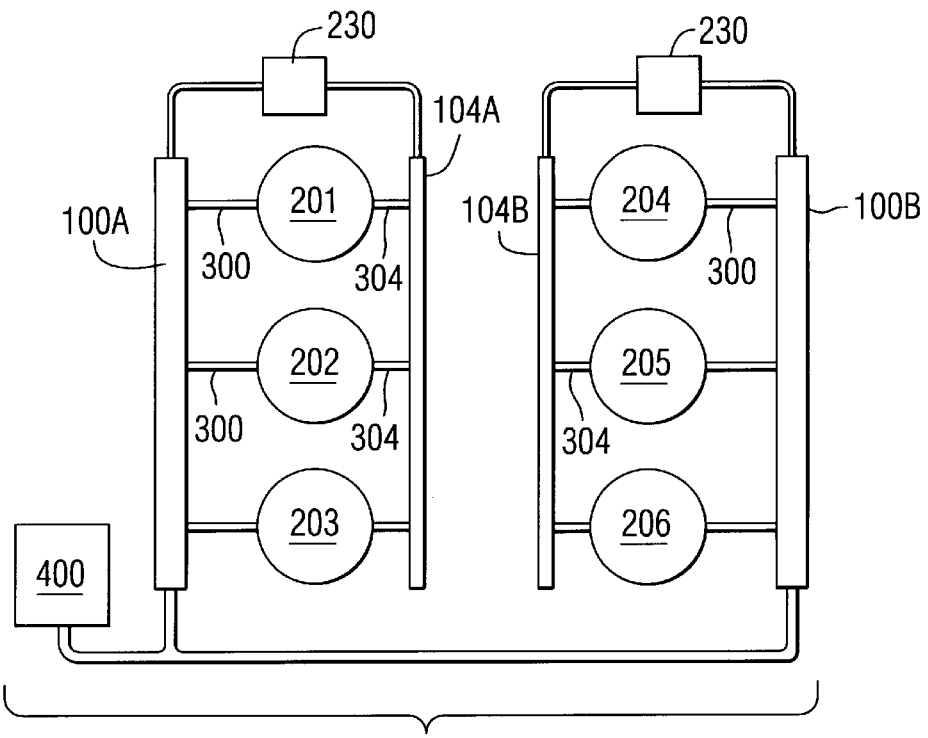
FIGS. 6 and 7 show two embodiments of the present invention with alternative interconnections between the air rails and fuel rails.
Figure 7:
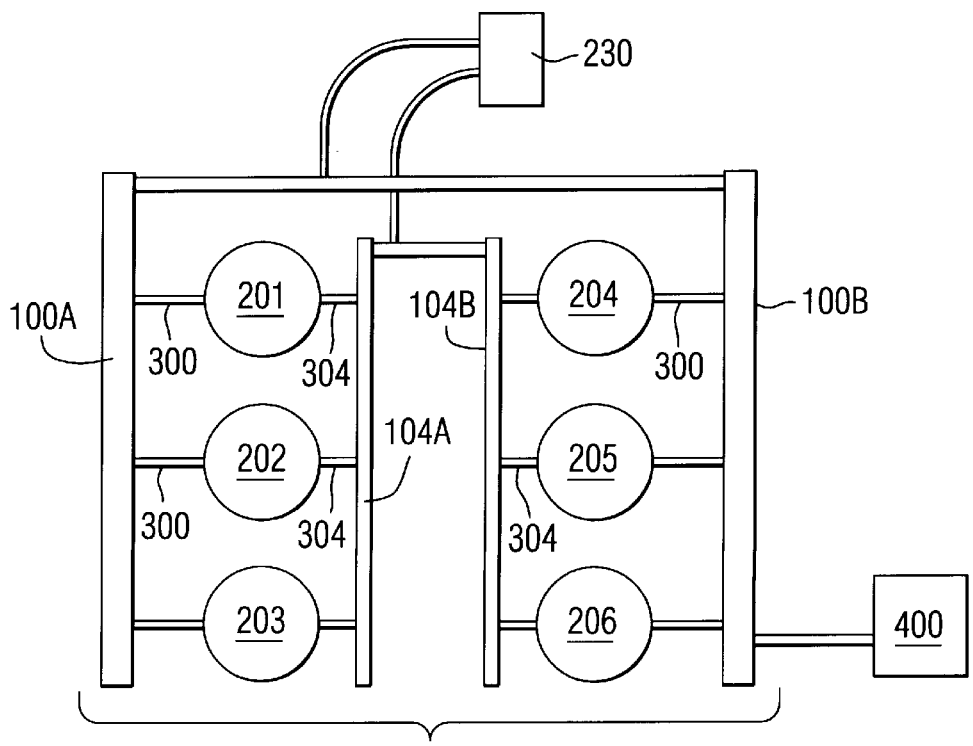

FIGS. 6 and 7 show simplified schematic representations of two embodiments of the present invention that differ from each other in the manner that the common air rail 100 and common fuel rail 104 are connected to the plurality of cylinders in an engine. FIGS. 6 and 7 are highly schematic, but are intended to show two alternative ways to connect the common air and fuel rails to the plurality of fuel injection arrangements and, as a result, to the cylinders.

FIG. 6 schematically shows six fuel injection arrangements 201–206 which are each associated with a particular cylinder of a six cylinder engine. A first common air rail 100A is connected in fluid communication with three of the fuel injection arrangements 201–203. A second common air rail 100B is connected in fluid communication with three other fuel injection arrangements 204–206. Similarly, first and second common fuel rails 104A and 104B are connected in fluid communication with three of the fuel injection arrangements, 201–203 and 204–206, respectively. Each of the pairs of common air and fuel rails is connected to a pressure regulator 230. In the particular embodiment shown in FIG. 6, the pressure regulators 230 are of the type that maintain a preselected differential pressure between their associated common fuel rails and common air rails. In other words, the purpose of the pressure regulators 230 in FIG. 6 is to maintain a differential pressure of approximately 10 psi between the fuel rails and the air rails to allow the fuel to be accurately metered and injected into the fluid passageway 110 of the fuel injection arrangements. In the embodiment shown in FIG. 6, the fuel injection system requires two common air rails and two common fuel rails.

FIG. 7 shows an alternative embodiment of the present invention in which the common air rails are connected together in such a way as to create, in essence, a single common air rail and a single common fuel rail which are both connected in fluid communication with each of the plurality of fuel injection arrangements. A single pressure regulator 230 in FIG. 7 maintains the differential pressure between the common air rail and the common fuel rail that is required to allow the fuel to be injected into the fluid passageway 110. With reference to FIGS. 2, 3, 6, and 7, the conduit 300 represents the interconnection conduit between the common air rail 100 and the fuel injection arrangements. Similarly, conduit 304 represents the connection between the common fuel rail 104 and the fuel injection arrangements.

In certain embodiments of the present invention, pressure from the combustion chamber 18 can be used to pressurize the air within the common air rail 100. As the piston 10 moves toward its top dead center (TDC) position, it closes both the intake and exhaust ports of the cylinder 12 and pressurizes the fluid within the combustion chamber 18. This pressurized fluid from the combustion chamber 18 can be used to pressurize the common air rail 100 if valve 114 remains opened during the appropriate part of the piston's cycle. Following the injection event, during which the fuel/air mixture flows from the fluid passageway 110, through the injection port 120, and into the combustion chamber 18, the high pressure fluid within the combustion chamber 18 can be allowed to flow from the combustion chamber, through the injection port 120, through the fluid passageway 110, through the conduit 300, and into the common air rail 100. This will pressurize the air within the common air rail and can be used in place of a compressor in some embodiments of the present invention. In the other embodiments of the present invention, this technique of using pressure from the combustion chamber 18 to pressurize the common air rail 100 can be used in addition to an external compressor. In FIGS. 6 and 7, an air compressor 400 is also shown connected to the common air rails. However, it should be understood that certain embodiments of the present invention do not require the air compressor 400 but, instead, can rely solely on the pressurization of the common air rail 100 performed by the uprightly moving piston 10 which compresses the fuel/air mixture of the combustion chamber 18 and causes it to flow through the fluid passageway 110 and into the common air rail 100.

Figure 8:
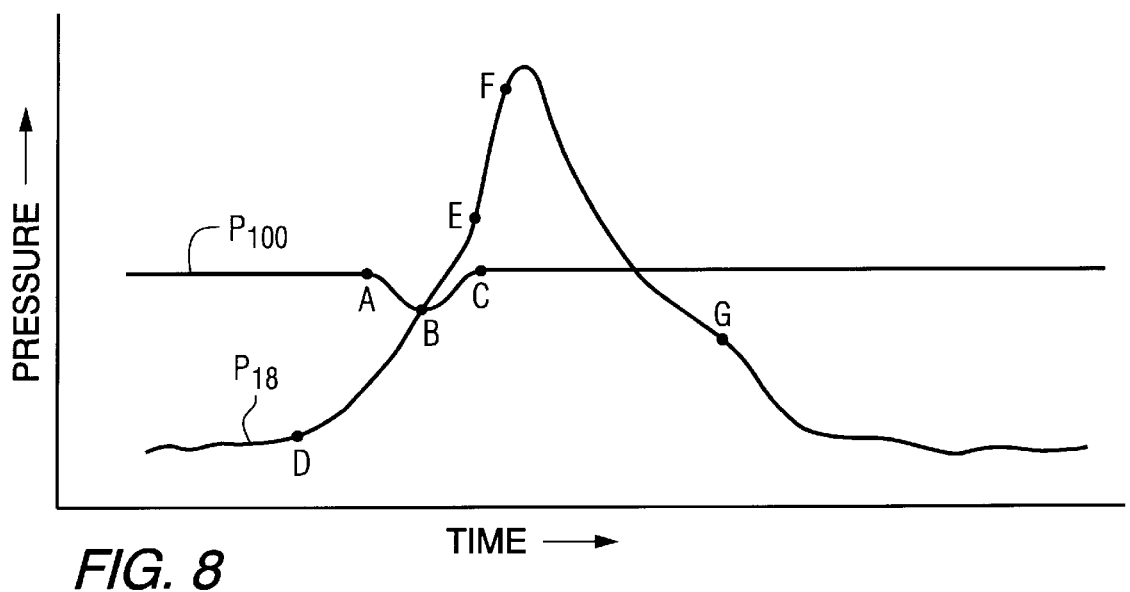
FIG. 8 is a time-based graph of the pressures within both the common air rail and the combustion chamber.
Figure 9:
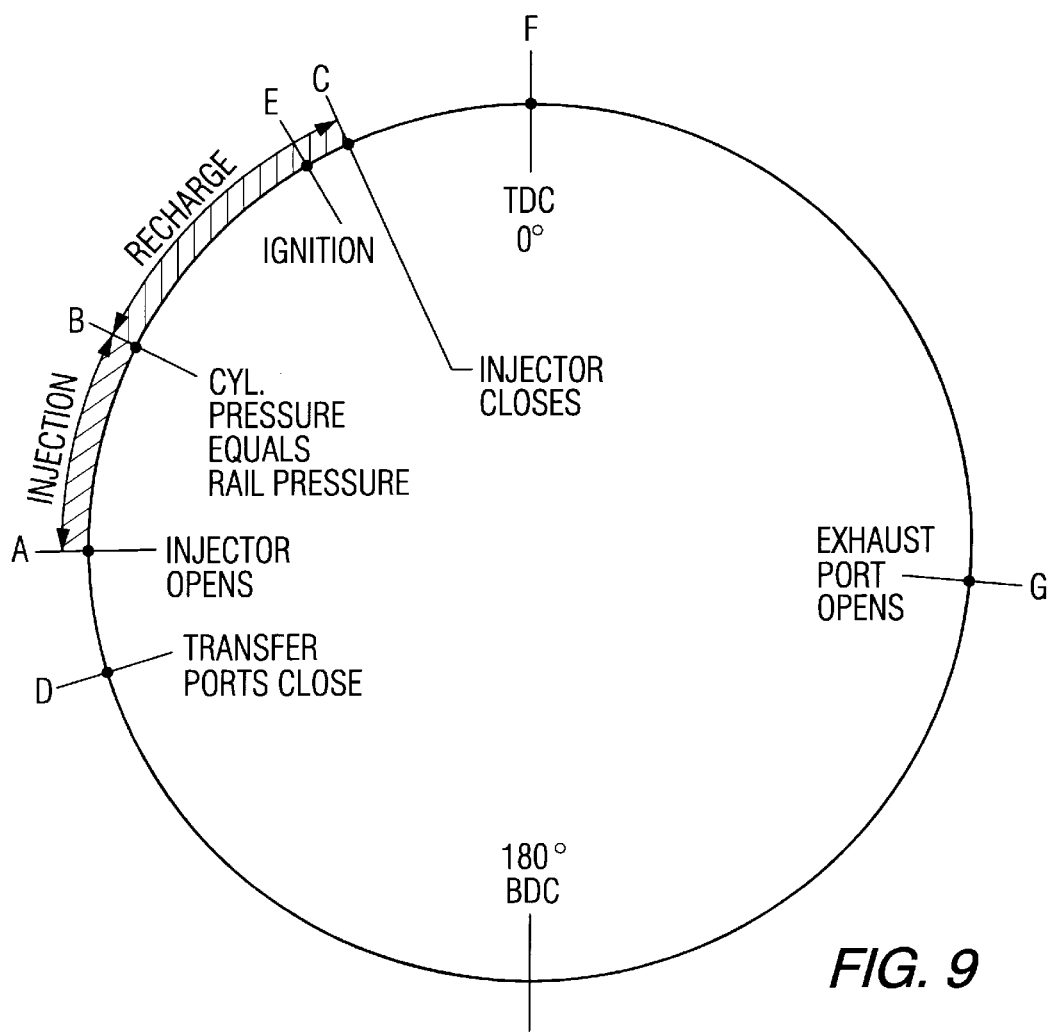
FIG. 9 is a circular representation of a series of events that occur during the operation of the present invention.

With reference to FIGS. 2, 8, and 9, the use of the upwardly moving piston 10 to pressure the common air rail 100 will be described. FIG. 8 shows two graphical representations of pressure as a function of time. Line $P_{18}$ represents the pressure within the combustion chamber 18 as a function of time as the piston 10 moves in a reciprocal path within cylinder 12. Line $P_{100}$ represents the pressure of the common air rail 100 and the fluid passageway 110 as a function of time.

FIG. 9 is a circular representation of the crankshaft end of a piston's connecting rod and also of the events identified by reference letters A–G. Those events are similarly identified in FIG. 8.

With reference to FIGS. 8 and 9, point A represents the time at which the injector is opened by moving valve 114 downward in FIG. 2. It can be seen that the pressure $P_{100}$ of the common air rail 100 is significantly greater than the pressure $P_{18}$ of the combustion chamber 18 at event A. Event B represents the event when all of the fuel/air mixture in the fluid passageway 110 has passed from the fluid passageway 110 into the combustion chamber 18. At this time, the pressure of the common air rail 100 has dropped coincidentally with the rise of the pressure within the combustion chamber 18 so that the two pressures are equal to each other and no relative flow exists between the fluid passage way 110 and the combustion chamber 18. As the piston 10 continues to move upward within the cylinder 12, the pressure of the combustion chamber 18 increases between event B and event C. Event E is when ignition is caused by the spark plug 14 and event C represents the closing of the injection port 120 by the valve 114 moving upward. Since the flame front of the ignition within the combustion chamber 18 takes a finite period of time to reach the injection port 120, event C can occur can slightly after the ignition of event E.

With continued reference to FIGS. 2, 8, and 9, the piston 10 eventually reaches its top dead center position at event F and, under the influence of the expansion of the fuel/air mixture as a result of the ignition at event E, the piston 10 begins its downward movement within the cylinder 12. This continues until the exhaust port opens at event G and the piston 10 eventually reaches its bottom dead center position. The piston 10 then begins moving upward again within cylinder 12 and eventually closes the transfer ports at event D. With the transfer ports closed, the pressure $P_{18}$ within the combustion chamber 18 begins to rise as represented in FIG. 8. Eventually, the cycle represented in FIG. 9 begins again at event A when the injector port 120 is opened by the downward movement of valve 114. The period of time between events B and C allows the pressure within the combustion chamber 18 to be used to raise the pressure within the common air rail 100. In certain embodiments of the present invention, this use of the charge from the combustion chamber 18 allows the system to operate without the need of an air compressor 400.

In the description above of the various embodiments of the present invention, the fuel injection system has been described as having a common air rail 100 and a common fuel rail 104. In addition, the common air and fuel rails have been described as being pressurized at relative pressures that provide a differential between the fuel and air rails that allows fuel to be injected into the fluid passageway 110. In a typical application of the present invention, the common fuel rail 104 is pressurized at approximately 90 psi and the common air rail 110 is pressurized at approximately 80 psi to provide a 10 psi differential pressure. In all embodiments of the present invention, the air conduit 300 which provides the flow of air from the common air rail 100 to the injection port 120 is formed within the head of the engine. Similarly, the fuel conduit 304 is formed within the head 108 of the engine. This important characteristic of the present invention provides an advantage by combining the fuel and air at a location proximate the injection port 120. As a result, when the valve 114 opens the injection port 120, all of the fuel/air mixture will be forced into the combustion chamber 18 rather than allowing a small portion of the fuel to remain in the fluid passageway 110 and possibly be transferred back upward through conduit 300 and into the common air rail 100. In all of the embodiments of the present invention, the fuel is metered into the fluid passageway 110 by a pressure-time metering technique. This metering technique relies on the constant known pressure of the fuel within the common fuel rail 104 and uses a preselected time period to allow this pressurized fuel to flow from the common fuel rail 104 into the fluid passageway 110.

In certain preferred embodiments of the present invention, the common air rail 100 and the common fuel rail 104 are both contained within the head 108 of the engine. Also, in certain embodiments of the present invention, an air compressor 400 is used as an additional pressure source to pressurize the common air rail 100. A pressure regulator, 130 or 230, can be used to regulate the pressure of the common air rail 100 or, alternatively, the pressure differential between the common air rail 100 and the common fuel rail 104. The engine on which the present invention is used can comprise six cylinders. A common air rail 100 can be provided for all of the cylinders of the engine, or, multiple common air rails can be provided wherein each of the common air rails is connected in fluid communication with a preselected number of cylinders and associated fuel injection arrangements. Alternative embodiments of the present invention can dedicate a single cylinder of the engine as a compressor which serves only to compress the air within the common air rail 100 and is not used to provide torque for the engine. Conversely, one or more cylinders of the engine can be used as a compressor on certain cycles of the piston 10 and used to provide torque on other cycles of the piston 10 of that particular cylinder.

Although the present invention has been described with particular specificity to illustrate several preferred embodiments, it should be understood that alternative embodiments are also within its scope.

I claim:

1. A fuel injection system, comprising:
   an engine having a plurality of cylinders;
   a common air rail;
   a common fuel rail;
   a pressure regulator which maintains a generally constant pressure differential between said common air rail and said common fuel rail;
   a plurality of fuel injection arrangements, each of said plurality of fuel injection arrangements being located at an associated one of said plurality of cylinders, each of said plurality of fuel injection arrangements comprising:
      a fluid passageway formed within a head of said engine and extending into fluid communication with said associated one of said plurality of cylinders at an injection port, said fluid passageway being in fluid communication with said common air rail;
      a valve movable between a closed position and an open position with respect to said injection port;
      a fuel injector disposed in fluid communication with said fluid passageway and with said common fuel rail to cause a preselected quantity of fuel to flow from said common fuel rail to said fluid passageway, said preselected quantity being determined by the pressure within said common fuel rail and the time that said fuel injector permits fuel to flow from said common fuel rail toward said fluid passageway; and
   whereby said common air rail and said common fuel rail are both connected in fluid communication with each one of said plurality of fuel injection arrangements, said common air rail being formed within and as an integral part of said head of said engine.

2. The fuel injection system of claim 1, wherein:
   said common air rail is pressurized by the charge compressed within at least one of said plurality of cylinders during at least a portion of a cycle of operation of said engine.

3. The fuel injection system of claim 1, wherein:
   said common air rail is cast as a cavity within said head of said engine.

4. The fuel injection system of claim 1, wherein:
   said common fuel rail is contained within said head of said engine.

5. The fuel injection system of claim 4, wherein:
   said common fuel rail is cast as a cavity within said head of said engine.

6. The fuel injection system of claim 1, further comprising:
   an air compressor connected in fluid communication with said common air rail, said air compressor providing pressurized air to said common air rail.

7. The fuel injection system of claim 6, wherein:
   said common air rail is pressurized both by said air compressor and by the charge compressed within at least one of said plurality of cylinders during at least a portion of a cycle of operation of said engine.

8. The fuel injection system of claim 1, wherein:
   said plurality of cylinders comprises six cylinders;
   said plurality of fuel injection arrangements comprises six fuel injection arrangements; and
   said common air rail is connected in fluid communication with each of said six fuel injection arrangements.

9. The fuel injection system of claim 1, wherein:
   said plurality of cylinders comprises six cylinders;
   said plurality of fuel injection arrangements comprises six fuel injection arrangements; and
   said fuel injection system comprises two common air rails, a first one of said two common air rails is connected in fluid communication with a first three of said six fuel injection arrangements and a second one of said two common air rails is connected in fluid communication with a second three of said six fuel injection arrangements.

10. The fuel injection system of claim 1, further comprising:
    a cylinder, in addition to said plurality of cylinders which is used as a compressor to provide pressurized air to said common air rail.

11. The fuel injection system of claim 10, wherein:
    said additional cylinder periodically used as a torque providing cylinder and periodically used as said compressor.

12. The fuel injection system of claim 2, wherein:
    each of said plurality of cylinders is periodically used to pressurize said common air rail during at least a portion of a cycle of operation of said engine.

* * * * *